United States Patent [19]

Kobayashi

[11] 4,118,952
[45] Oct. 10, 1978

[54] FLEXIBLE JOINT FOR A POWER TRANSMISSION

[75] Inventor: Katsuyuki Kobayashi, Toyota, Japan

[73] Assignee: Toyota Jidosha Kogyo Kabushiki Kaisha, Japan

[21] Appl. No.: 692,754

[22] Filed: Jun. 4, 1976

[30] Foreign Application Priority Data

Jun. 4, 1975 [JP] Japan .................................. 50/67399

[51] Int. Cl.² ........................ F16D 3/52; F16D 3/60
[52] U.S. Cl. ................................ 64/12; 64/27 NM; 64/19
[58] Field of Search ............. 64/12, 19, 11 R, 27 NM, 64/27 R, 27 B, 10, 14; 74/579

[56] References Cited

U.S. PATENT DOCUMENTS

| 2,397,642 | 4/1946 | Blazek et al. ................. 64/27 NM |
| 3,353,373 | 11/1967 | Schumacher et al. ............. 64/11 R |

FOREIGN PATENT DOCUMENTS

| 752,815 | 7/1956 | United Kingdom ........................ 64/12 |
| 1,335,663 | 10/1973 | United Kingdom ........................ 64/12 |
| 1,352,231 | 5/1974 | United Kingdom ........................ 64/12 |

Primary Examiner—Benjamin W. Wyche
Assistant Examiner—R. C. Turner
Attorney, Agent, or Firm—Oblon, Fisher, Spivak, McClelland & Maier

[57] ABSTRACT

A flexible joint for a power transmission of the divided type includes an assembly of bolt hole metal sleeves disposed upon the drive side, and bolt hole metal sleeves disposed upon the driven side, arranged alternately upon the circumference of the transmission and linked together by joint elements, characterized in that the compressive rigidity of the joint elements upon which a compressive force acts under acceleration conditions is greater than the compressive rigidity of the joint elements upon which a tensile force acts under acceleration conditions, thereby realizing an optimum design in terms of both strength and economy.

9 Claims, 7 Drawing Figures

FIG. 1
FIG. 2
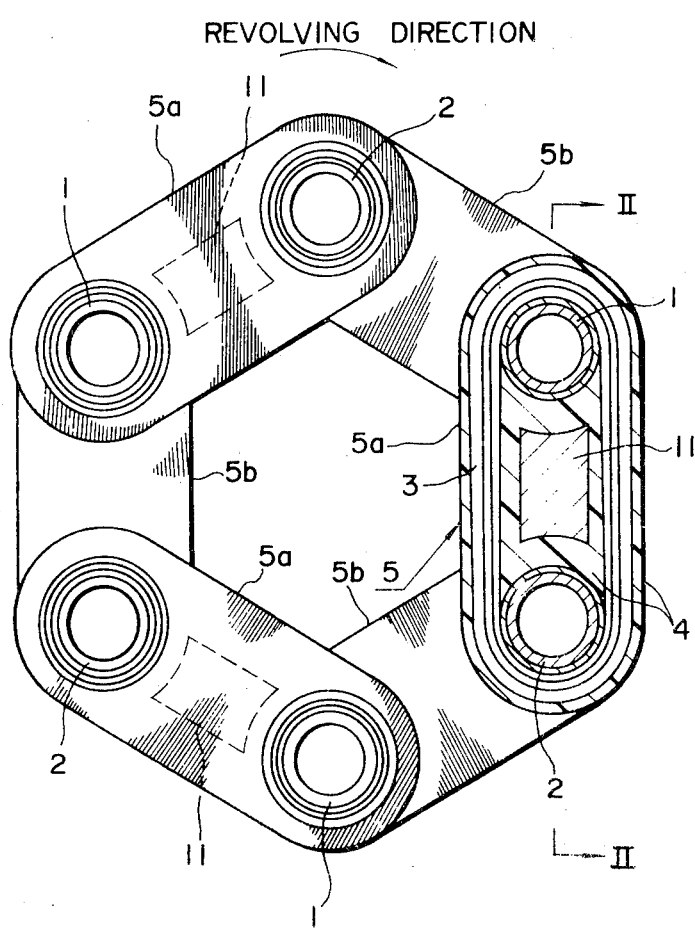
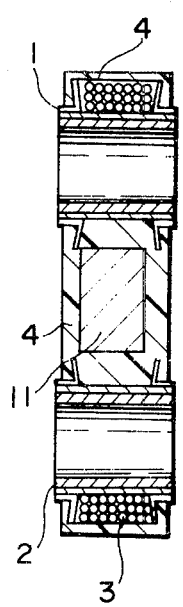

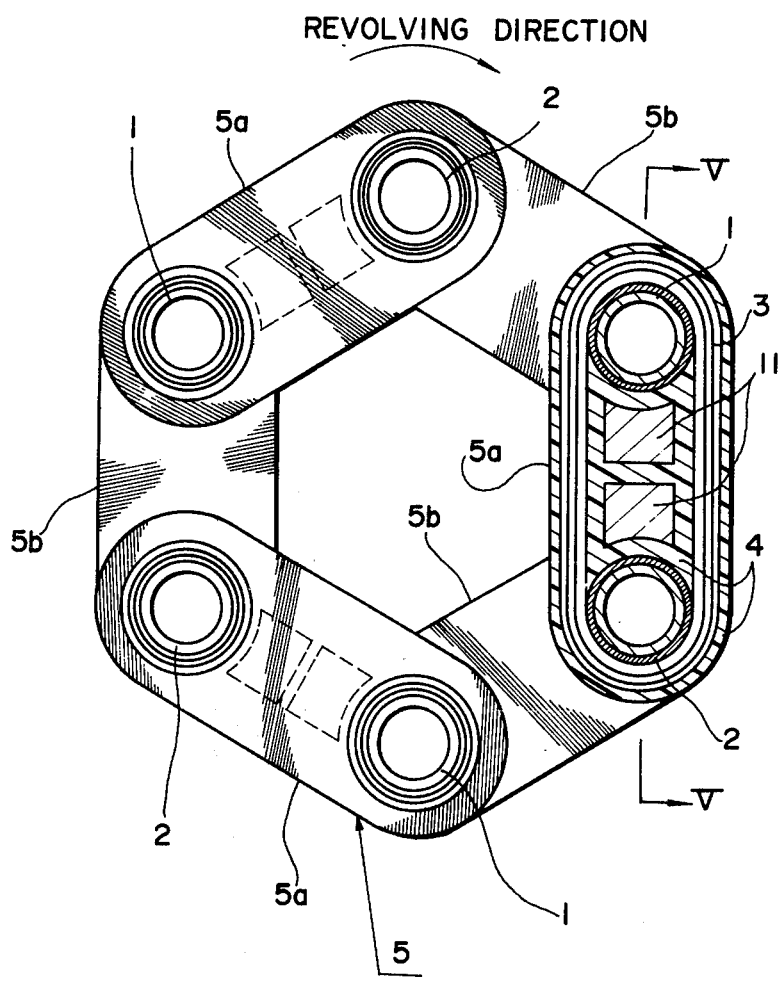
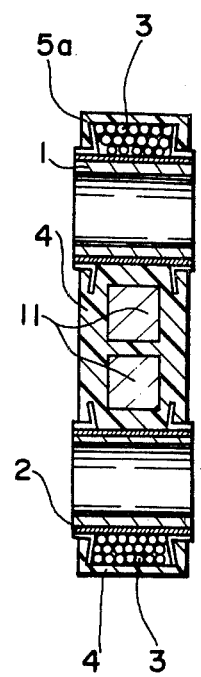

FIG.6
REVOLVING DIRECTION
FIG.7
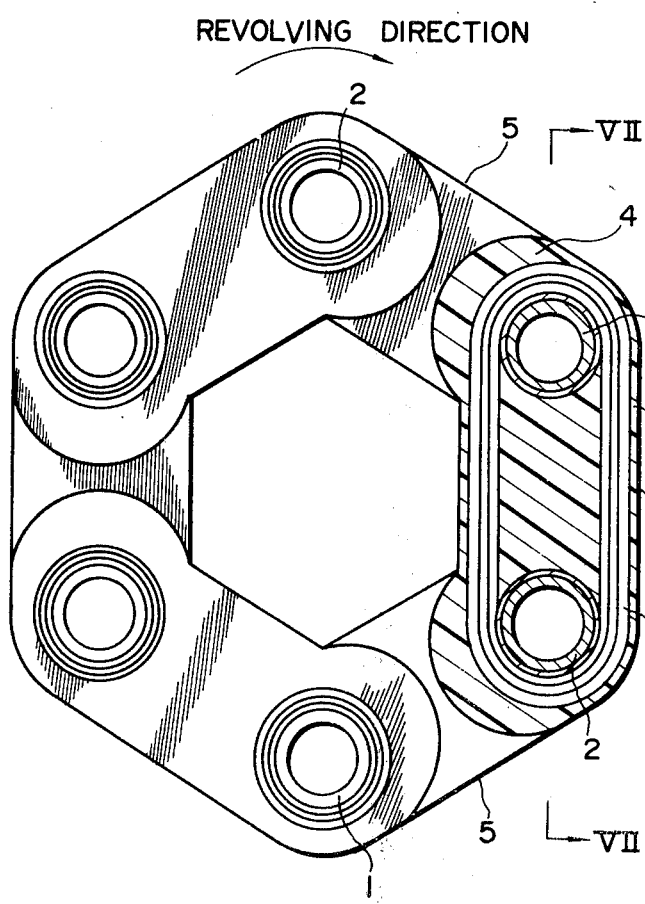
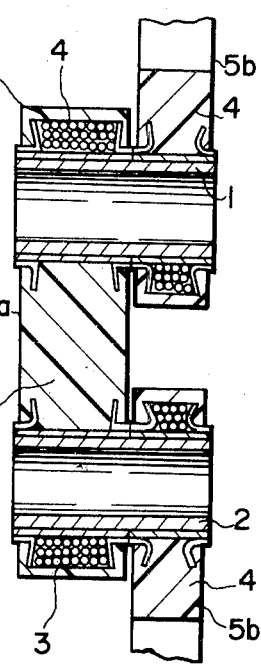

FLEXIBLE JOINT FOR A POWER TRANSMISSION

BACKGROUND OF THE INVENTION

1. Field of the Invention

The present invention relates generally to transmissions, and more particularly to an improvement of a flexible joint for a power transmission of the divided type.

2. Description of the Prior Art

Within certain power transmissions shafts, such as, for example, the propeller shaft of an automobile, the vibration of the drive system is transmitted by the shaft to the devices located downstream thereof, and a flexible joint is sometimes installed midway upon the power transmission shaft so as to prevent the transmission of such vibrations in order to avoid damage to the successive or downstream devices by means of such vibrations of the drive system or noise generated thereby through resonance thereof. An assembly of multi-split joint elements linked together is one example of such flexible joints.

Such a divided type flexible joint is constructed such that the bolt hole metal sleeves upon the drive side of the transmission, for holding the bolts with which to fix the flexible joint to the drive shaft, and the bolt hole metal sleeves disposed upon the driven side, for holding the bolts with which to fix the flexible joint to the driven shaft, are alternately arranged upon the circumference of the transmission, and the adjacent drive-side bolt-hole metal sleeves are linked together with joint elements which are wound with an endless elastic fiber or band and then enveloped with rubber or a synthetic resin.

When a torque is applied to the flexible joint of this type, the joint elements thus linked in a loop will alternately receive a tensile force and a compressive force, and consequently, the joint elements which are subjected to compression are likely to be locally deflected when the compressive force exceeds a predetermined limit, resulting in that the internal fiber or band becomes exposed due to rupture of the other components. Even when such excessive damage is not done, however, the joint elements which have been under compression may be exposed to tension forces under reverse operation conditions, and depending upon the ratio between normal and reverse operations, and upon the frequency of such operations, it may not always be ideal to have all of the joint elements conventionally built with the same shape and rigidity.

SUMMARY OF THE INVENTION

Accordingly, it is an object of the present invention to provide a flexible joint for a power transmission which is free from the above-noted drawbacks, wherein the compressive rigidity of the joint elements upon which a compressive force acts under acceleration conditions is greater than the compressive rigidity of the joint elements upon which a tensile force acts under acceleration conditions.

Another object of the present invention is to provide a flexible joint for a power transmission wherein the compressive rigidity of the joint elements upon which a compressive force acts under acceleration conditions is increased by the provision of a stopper embedded therein.

Still another object of the present invention is to provide a flexible joint for a power transmission wherein the compressive rigidity of the joint elements upon which a compressive force acts under acceleration conditions is increased by the provision of at least two stoppers embedded therein.

Yet another object of the present invention is to provide a flexible joint for a power transmission wherein the compressive rigidity of the joint elements upon which a compressive force acts under acceleration conditions is increased by making the shape, width, and/or thickness of these elements greater than those structural characteristics of the joint elements upon which a tensile force acts under acceleration conditions.

A further object of the present invention is to provide a flexible joint for a power transmission wherein the compressive rigidity of the joint elements upon which a compressive force acts under acceleration conditions is increased by increasing the hardness of the rubber or synthetic resin which constitutes an active component of these elements.

A still further object of the present invention is to provide a flexible joint for a power transmission wherein the compressive rigidity of the joint elements upon which a compressive force acts under acceleration conditions is increased by increasing the compressive rigidity of the endless cord or band which constitutes an active component of these elements.

A yet further object of the present invention is to provide a flexible joint for a power transmission wherein the compressive rigidity of the joint elements upon which a compressive force acts under acceleration conditions may be increased through means of an adequate combination of the above-mentioned means.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a plan view, partly in cross-section, of one of the joint elements of a flexible joint contructed in accordance with the present invention, within which a single stopper is embedded within the joint elements disposed upon the compression side of the transmission;

FIG. 2 is a cross-sectional view of the element of FIG. 1 taken along the line II—II of FIG. 1;

FIG. 4 is a view similar to that of FIG. 1, illustrating however a second embodiment of the present invention, within which two stoppers are embedded within the joint elements disposed upon the compression side of the transmission;

FIG. 5 is a cross-sectional view of the element of FIG. 4 taken along the line V—V of FIG. 4;

FIG. 6 is a view similar to that of FIG. 1, illustrating however another embodiment of the present invention, within which the width and thickness of the joint elements, disposed upon the compression side of the transmission of the transmission, are increased; and FIG. 7 is a cross-sectional view of the element of FIG. 6 taken along the line VII—VII of FIG. 6.

DETAILED DESCRIPTION OF THE ILLUSTRATED EMBODIMENTS

Figure 3:
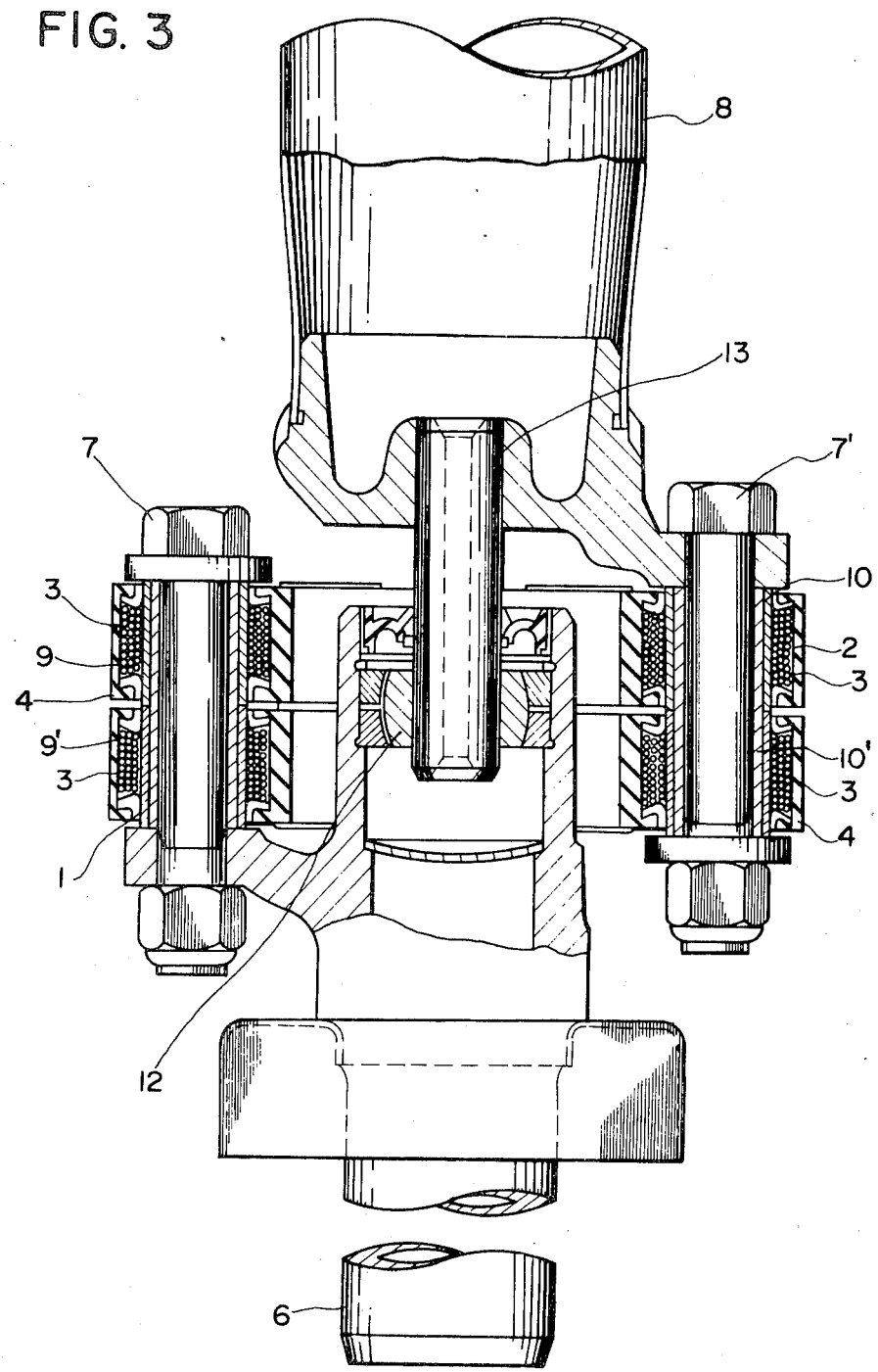
FIG. 3 is a cross-sectional view of a transmission assembly including the flexible joint of FIGS. 1 and 2.

Referring now to the drawings, and more particularly to FIGS. 1 and 2 thereof, there is illustrated one embodiment of the present invention within which a single hard core is enclosed within a rubber matrix which constitutes a joint element for the purpose of increasing the compressive rigidity of joint elements upon which a compressive force acts under acceleration conditions. As seen within FIGS. 1–3, the same number of drive-side bolt-hole metal sleeves 1 for holding bolts 7, which are provided in order to fix the flexible joint to the drive shaft 6, and driven-side bolt-hole metal sleeves 2 for holding bolts 7', which are provided in order to fix the flexible joint to the driven shaft 8, are alternately arranged along the circumference of the joint.

Collars 9 and 9', and 10 and 10' are pressed onto the bolt hole metal sleeves 1 and 2, and adjacent bolt hole metal sleeves and collars are linked together by means of endless, elastic cords or bands 3 wound thereabout, for torque transmission therebetween. The elastic cords 3 can be of any shape so long as they transmit the desired torque, and may be, for example, a line or a band. The cords are solidly coated interiorly and exteriorly with rubber or a synthetic resin 4, and within the joint elements 5a, upon which a compressive force acts under acceleration conditions, a single stopper 11 made of, for example, metal, plastic, or other material which is harder than the surrounding rubber or synthetic resin 4, is embedded, as illustrated within FIGS. 1 and 2, interiorly of the cords 3 where the greatest compressive stress is developed when a compressive force acts upon the joint elements. As a result, the compressive rigidity of first joint element 5a having an embedded stopper 11 becomes remarkably greater than the compressive rigidity of second joint elements 5b without an embedded stopper 11.

For the purpose of centering the drive shaft 6 and the driven shaft 8 within the assembly, a rod 13 secured within the driven shaft assembly is disposed within and through a sperical piece 12 provided within the drive shaft assembly, additional flexibility being provided thereby. Within a flexible joint having such an arrangement, deflection is permitted, with proper centering assured between the drive shaft 6 and the driven shaft 8, and the compression resistance, or in other words, the compressive rigidity of the joint elements disposed on the running or driving side of the drive-side bolt-hole metal sleeves 1, that is, joint elements 5a, upon which compressive forces act under acceleration conditions, can be increased.

Another embodiment within which at least two stoppers are embedded within the joint elements, is illustrated within FIGS. 4 and 5. Except for the number of stoppers 11, the constitution of this embodiment is the same as that of the first embodiment, and consequently, a detailed description of the same is omitted. When more than two stoppers 11 are provided, the stoppers 11 can easily follow the deflection of the rubber or synthetic resin 4, and therefore, cracking of the rubber matrix and separation of the rubber from the other components can be prevented. Moreover, by adjusting the size and gap of the stoppers, a flexible joint, with a load-deflection characteristic matching its intended use, can easily be provided.

A third embodiment of the present invention within which the compressive rigidity of the flexible joint is increased by changing the external shape size, width and thickness of one joint element relative to such characteristics of the other joint element is illustrated within FIGS. 6 and 7, wherein a detailed description of the same components present within the first embodiment is omitted. Within this embodiment, the shape, width and thickness of the joint elements 5a, upon which compressive forces act under acceleration conditions, are made greater than such structural characteristics of the joint elements 5b upon which tensile forces act under acceleration conditions, and thus, the compressive rigidity of elements 5a is greater than that of 5b. The performance of this flexible joint is similar to that of the joint of the first embodiment.

Still another means of increasing the compressive rigidity of the joint elements is to alter the hardness of the rubber or synthetic resin matrix, which constitutes one joint element, relative to that of the rubber or synthetic resin matrix which constitutes another joint element. In this case, the hardness of the rubber or synthetic resin matrix 4 of the joint element 5a upon which a compressive force acts under acceleration conditions may be made greater than that of the joint element 5b upon which a tensile force acts under acceleration conditions, and thus, the compressive rigidity of element 5a is greater than that of element 5b. The performance of this flexible joint is similar to that of the joint of the first embodiment.

A yet further means of increasing the compressive rigidity of the joint elements is to vary the number of turns, width and material quality of the cords or bands 3 composed of elastic fiber and interposed between the joint elements. In this case, the compressive rigidity of the joint element 5a upon which a compressive force acts under acceleration conditions is likewise made greater than that of the joint element 5b upon which a tensile force acts under acceleration conditions, by adequately varying the number of turns, width and material quality of the cord or band 3 interposed between the two elements. The performance of this flexible joint is similar to that of the first embodiment.

The above-mentioned various means of increasing the compressive rigidity may not only be applied individually to the joint elements but may also be applied within an appropriate combination of the elements.

Through the use of a flexible joint for a power transmission constructed in accordance with the present invention, torque can be transmitted between two flexible shafts without permitting the transmission of vibration to the succeeding system. This is a performance naturally expected from the flexible joint, and moreover, in terms of both strength and economy, the flexible joint can be brought closer to the optimum design to peak efficiency with which the rigidity of a joint element upon which a compressive force acts under acceleration conditions is made greater, thereby preventing failure of the same under a compressive load, and depending upon the mode of loading, the shape and rigidity of each joint element can be varied.

Furthermore, since the present joint is a divided type flexible joint, merely composed, for example, of a joint element with a built-in stopper and a joint element without a built-in stopper, its manufacture and assembling are extremely simple.

Obviously, many modifications and variations of the present invention are possible in light of the above teachings. It is therefore to be understood that within the scope of the appended claims, this invention may be practiced otherwise than as specifically described herein.

What is claimed as new and desired to be secured by Letters Patent of the United States is:

1. A flexible joint of interconnected elements for a power transmission, which comprises:
   a plurality of first joint element means;
   a plurality of second joint element means, each alternately arranged with respect to each of said first joint element means and interconnecting said first joint element means, each of said first joint element means and said second joint element means including adjacent bolt metal collars having elastic means wrapped thereabout and rubber or synthetic resin means disposed interiorly and exteriorly thereof;
   bolt-hole metal sleeves disposed within said collars; and
   means for increasing the compressive rigidity of said first joint element means embedded only within said rubber or synthetic resin means of said first joint element means so as to effectively resist a compressive force acting thereon under acceleration conditions.

2. The flexible joint for a power transmission as set forth in claim 1, wherein:
   said means for increasing the compressive rigidity of said first joint element means upon which a compressive force acts under acceleration conditions comprises a single stopper of a material with greater hardness than that of said rubber or synthetic resin means which surrounds it.

3. The flexible joint for a power transmission as set forth in claim 1, wherein:
   said means for increasing the compressive rigidity of said first joint element means upon which a compressive force acts under acceleration conditions comprises two or more stoppers of a material with greater hardness than that of said rubber or synthetic resin means which surrounds it, in a serial, separated disposition.

4. A flexible joint of interconnected elements for a power transmission, which comprises:
   a plurality of first joint elements;
   a plurality of second joint elements, each alternately arranged with respect to each of said first joint element means and interconnecting said first joint element means, each of said first joint element means and said second joint element means including adjacent bolt metal collars having elastic means wrapped thereabout and rubber or synthetic means disposed interiorly and exteriorly thereof;
   bolt-hole metal sleeves disposed within said collars; and
   means for increasing the compressive rigidity of said first joint element means so as to effectively resist a compressive force acting thereon under acceleration conditions which comprises elements having a greater width, thickness, and overall size than those structural characteristics of said second joint element means upon which a tensile force acts under acceleration conditions.

5. A flexible joint of interconnected elements for a power transmission, which comprises:
   a plurality of first joint elements;
   a plurality of second joint elements, each alternately arranged with respect to each of said first joint element means and interconnecting said first joint element means, each of said first joint element means and said second joint element means including adjacent bolt metal collars having elastic means wrapped thereabout and rubber or synthetic means disposed interiorly and exteriorly thereof;
   bolt-hole metal sleeves disposed within said collars; and
   means for increasing the compressive rigidity of said first joint element means so as to effectively resist a compressive force acting thereon under acceleration conditions which comprises elements of a rubber of synthetic resin which is harder than the rubber of synthetic resin constituting said second joint element means upon which a tensile force acts under acceleration conditions.

6. The flexible joint for a power transmission, as set forth in claim 1, wherein:
   said elastic means is an endless band looped around said first joint element means collars.

7. The flexible joint for a power transmission as set forth in claim 2, wherein:
   said stopper is made of metal.

8. The flexible joint for a power transmission as set forth in claim 2, wherein:
   said stopper is made of plastic.

9. The flexible joint for a power transmission as set forth in claim 1, wherein:
   said elastic means comprises a plurality of turns of cord; and,
   said means for increasing the compressive rigidity of said first joint element means includes varying the number of turns of said cord.

* * * * *